US011883356B2

(12) United States Patent
Moran

(10) Patent No.: US 11,883,356 B2
(45) Date of Patent: Jan. 30, 2024

(54) MULTI-FACETED TISSUE THERAPY TOOL

(71) Applicant: Matthew Moran, Vernon, NY (US)

(72) Inventor: Matthew Moran, Vernon, NY (US)

(73) Assignee: Matthew Moran, Vernon, NY (US)

( * ) Notice: Subject to any disclaimer, the term of this patent is extended or adjusted under 35 U.S.C. 154(b) by 934 days.

(21) Appl. No.: 15/860,877

(22) Filed: Jan. 3, 2018

(65) Prior Publication Data

US 2019/0201283 A1 Jul. 4, 2019

(51) Int. Cl.
*A61H 39/00* (2006.01)
*A61H 39/04* (2006.01)
(Continued)

(52) U.S. Cl.
CPC ............. *A61H 39/04* (2013.01); *A61H 7/003* (2013.01); *A61H 39/007* (2013.01); *A61H 7/004* (2013.01); *A61H 2015/0007* (2013.01)

(58) Field of Classification Search
CPC ........ A61H 39/00; A61H 39/04; A61H 7/002; A61H 7/003; A61H 7/004; A61H 39/007;
(Continued)

(56) References Cited

U.S. PATENT DOCUMENTS 472,572 A * 4/1892 Forest ................ A61H 15/0092 601/119
1,908,051 A 5/1933 Heinrich
(Continued)

FOREIGN PATENT DOCUMENTS

JP H11104196 A 10/1999
JP 2009515613 A 4/2009
(Continued)

OTHER PUBLICATIONS

Roser, Max et al., “Human Height—Our World in Data”, originally published 2013 (Year: 2013).*
(Continued)

*Primary Examiner* — Bradley H Philips
*Assistant Examiner* — Savannah L Gabriel
(74) *Attorney, Agent, or Firm* — Eschweiler & Potashnik, LLC

(57) ABSTRACT

This invention comprises a mounted unit that combines the healing power of touch with functional, multi-faceted human engineering body manipulation and stress relief by incorporating the most basic principles of massage, acupressure, reflexology, rubbing/scratching, Shiatsu, and other health improvement techniques to provide the user with an easy-to-use, self-administrable stimulation experience. The unit contains a plurality of generally domed protrusions from each of which extends a nail-like rib running through the center of the domed surface, which perform the massaging experience when a user rubs his or her back against it at a pressure desirable to the user. The mounted unit can comprise a removable handheld unit that increases the body areas which can be massaged by the invention and a hinged door, behind which can be stored specialized attachments that are removably fastenable onto the protrusions for more focused massage.

21 Claims, 13 Drawing Sheets

(51) Int. Cl.
*A61H 7/00* (2006.01)
*A61H 15/00* (2006.01)

(58) Field of Classification Search
CPC ............ A61H 2015/0007; A61H 37/00; A61H 23/00; A61H 23/01; A61H 23/002; A61H 23/003; A61H 23/007; A61H 23/004; A61H 23/006; A61H 23/008; A61H 23/02; A61H 23/0218; A61H 23/0227; A61H 23/0245; A61H 23/0254; A61H 23/0263; A61H 23/04; A61H 23/06; A61H 21/00; A61H 19/00–50; A61H 2201/1695; A61H 2201/1692; A01K 13/00
USPC .................................................. D24/211–215
See application file for complete search history.

(56) References Cited

U.S. PATENT DOCUMENTS 3,359,588 A * 12/1967 Kobler .................. A61H 13/00 15/167.1
4,249,521 A 2/1981 Gueret
4,308,860 A * 1/1982 Sanders .................. A46B 1/00 15/227
5,018,511 A 5/1991 Yokoi
5,607,749 A 3/1997 Strumor
5,728,051 A * 3/1998 Chi ........................ A61H 7/004 601/112
5,810,875 A * 9/1998 Meilus .................. A61H 1/008 606/204
5,833,635 A * 11/1998 Aboud, Sr. ............ A61H 7/003 601/136
5,843,005 A 12/1998 Chubinsky
6,110,132 A 8/2000 Kurpieski
6,245,031 B1 6/2001 Pearson
6,565,522 B1 * 5/2003 Chen ...................... A61H 15/00 601/118
6,584,637 B1 * 7/2003 Witter ...................... A46B 5/04 15/160
6,994,680 B1 2/2006 Aponte
7,011,639 B1 3/2006 Vigiletti
7,500,282 B1 3/2009 Park
8,622,890 B1 * 1/2014 Caggiano ............... A61H 19/34 600/38
8,631,523 B1 1/2014 Schneider
9,186,294 B1 * 11/2015 Free ....................... A61H 7/002
D750,841 S 3/2016 Lewis
D759,292 S 3/2016 Columbus
10,363,195 B2 * 7/2019 Raines ............... A61H 15/0092
10,716,702 B2 * 7/2020 Kamat .................. A61F 7/0241
2003/0130602 A1 7/2003 Chang
2005/0090768 A1 * 4/2005 Brattesani ............. A61H 23/02 601/70
2006/0162108 A1 * 7/2006 Georgi .................. A46B 9/005 15/167.1
2007/0118968 A1 * 5/2007 Doty ...................... A61H 7/003 2/160
2007/0123807 A1 * 5/2007 Applebaum ....... A61H 15/0085 601/20
2008/0306331 A1 * 12/2008 Morreale .............. A61H 19/50 600/38
2008/0306417 A1 * 12/2008 Imboden ................ A61H 19/00 601/134
2009/0088672 A1 4/2009 Vaughan et al.
2009/0165731 A1 7/2009 Garry et al.
2009/0182249 A1 7/2009 Sakai et al.
2010/0010403 A1 1/2010 Haviland
2011/0138556 A1 * 6/2011 Sanchez Martinez ...................... A46B 15/0034 15/145
2011/0166481 A1 * 7/2011 Rhoad .................... A61H 7/002 601/1
2013/0096472 A1 * 4/2013 Bertram ............ A61H 15/0092 601/120
2014/0200507 A1 7/2014 Azeez
2017/0143583 A1 * 5/2017 Lin .................... A61H 15/0092
2017/0231851 A1 * 8/2017 Faussett ................ A61H 15/00 601/135
2018/0049938 A1 * 2/2018 Fleming ................. A61G 7/072
2018/0353371 A1 * 12/2018 Shikahama ........ A61H 15/0092

FOREIGN PATENT DOCUMENTS

JP 2009515631 A 4/2009
JP 2013154130 A 8/2013
JP 5363146 B2 * 12/2013
KR 20170002112 U 6/2017
WO 2006062108 A 6/2006
WO 2007079294 A2 7/2007

OTHER PUBLICATIONS

Department of Defense, Design Criteria Standard Human Engineering, MIL-STD-1472G-1, Jan. 11, 2012.
PCT Patent Office, "International Search Report and Written Opinion for PCT Patent Application No. PCT/US2019/012136", dated Mar. 15, 2019, 11 pages.
United Kingdom Intellectual Property Office, "Examination Report for United Kingdom Patent Application No. GB2012050.7", dated Aug. 5, 2021, 5 pages.
United Kingdom Intellectual Property Office, "Examination Report for United Kingdom Patent Application No. 2012050.7", dated Aug. 2, 2022, 4 pages.
Japanese Intellectual Property Office, "Office Action for Japanese Patent Application No. 2020-537616", dated Feb. 1, 2023, 3 pages.

* cited by examiner

MULTI-FACETED TISSUE THERAPY TOOL

FIELD

This disclosure relates to skin and tissue contact and pressure devices, more particularly, to tools used for scratching or massaging.

BACKGROUND

A variety of devices are available wherein the user can scratch or massage areas of the body; however, such devices are generally either focused on massaging or scratching, with no viable option for effectively combining the two. Some of these devices, in their preferred embodiment, are wall mounted devices, but these are limited in usefulness due to their fixed location, which makes reaching certain areas of the body more difficult. Deep tissue massage requires a large concentrated amount of force, and this is not conducive to a device with many protrusions, which disperse the force across many points of contact. Therefore, it is desirable to have a user-friendly device that allows for both back scratching and back massaging. Combining these with deep tissue massage functionality would provide even more utility.

SUMMARY

The present invention combines the healing power of touch with functional, multi-faceted human engineering body manipulation and stress relief by incorporating the most basic principles of massage, acupressure, reflexology, rubbing/scratching, Shiatsu, and other health improvement techniques to provide the user with an easy-to-use, self-administrable stimulation experience.

In an embodiment of this device, a mounted backing unit is attached to a wall or other such flat or semi-flat vertical surface. The backing unit is comprised of a removable handheld unit and a hinged door unit. Both the removable handheld unit and the hinged door unit have a plurality of protrusions extending from their surface, each with a rib, which is a unique, nail-like projection, that when a user rubs his or her back against, the protrusions and rib create a pleasing combination massaging and scratching sensation against the user's skin. In an embodiment, the rib can comprise up to 40% of the convex surface of the protrusion to allow varied sensations, such as 5 to 35%, or 10 to 25%. Additionally, each rib is oriented at a different angle on each protrusion to allow a more dynamic tactile sensation that is more akin to the feeling of a hand scratching a back wherein not every nail is facing the same way, which creates up and down, side-to-side, and diagonal scratch patterns.

In an embodiment, the handheld unit is removably attached to the backing unit. On the back of the handheld unit is an ergonomically designed handle, which a user or another individual may hold to then administer the massaging experience to areas of the body other than the back, such as legs, arms, or simply provide more angular flexibility to massage the back. A vibrating motor can also be installed in the handle of the handheld unit to provide the user with even more options for his or her self-administered spa experience.

Interchangeable attachments with specialized heads are removably fastenable onto the protrusions. One such attachment can be a rotatable wheel with convex spokes, each with a rib similar to the ribs on the protrusions to provide more focused pressure. Another attachment can be a smooth cylindrical attachment with a convex head, again allowing the user to apply more focused pressure to an affected area, commonly known as acupressure.

Other features and advantages of the present invention will become apparent from the more detailed description below when taken in conjunction with the accompanying drawings.

DETAILED DESCRIPTION

Figure 1:
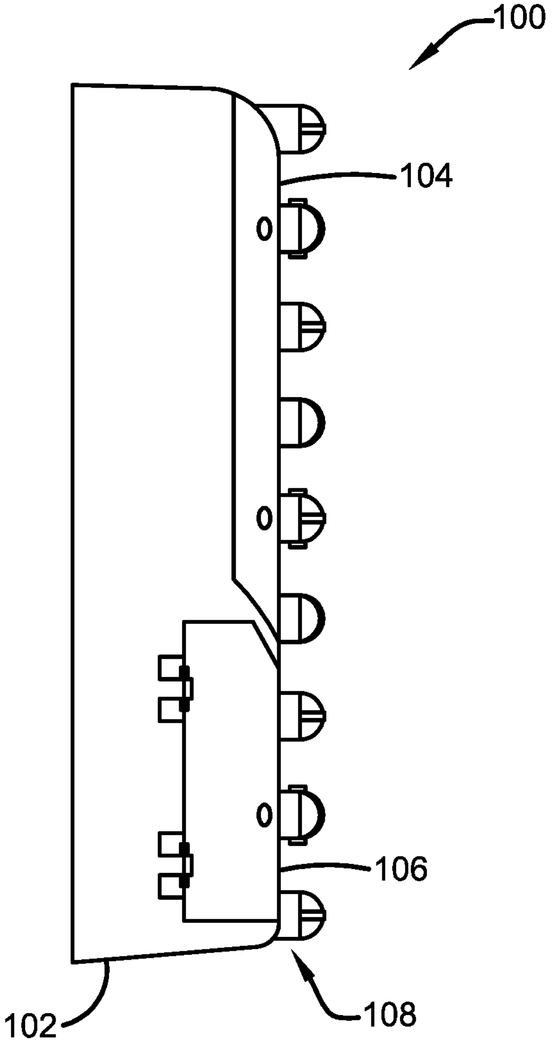
FIG. 1 is a side view of an exemplary embodiment tissue therapy tool with a door and a removable hand-held unit.

In the following description, for purposes of explanation, numerous specific details are set forth in order to provide a thorough understanding of one or more aspects. It may be evident, however, that such aspect(s) may be practiced without these specific details.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a," "an," and "the," as used in this application and the appended claims should be construed to mean "one or more" unless specified otherwise or clear from the context to be directed to a singular form. Additionally, as used herein, the term "exemplary" is intended to mean serving as an illustration or example of something, and is not intended to indicate a preference.

A key to a healthy life is a stress-free, limber body with good circulation. For most individuals, it is often difficult to reach and stimulate circulation in certain areas of the body without mechanical assistance. This is especially true for muscle trigger points, commonly called muscle knots, which are known to be a cause of muscle pain. To relieve the pain in these hard to reach places, an individual must go to a masseuse, reflexologist, or some other body manipulation expert, or alternatively spend significant time rolling out the affected area with a device such as a foam roller or tennis ball. Seeing a masseuse or reflexologist can be very effective; however, such services can quickly become excessively costly, especially for those segments of the population who require more attention to muscle tightness such as body builders. Similarly, rolling out the affected area with foam rollers or tennis balls can also be effective; however, although less costly than seeing an expert for a session, it can be difficult to target a specific affected area and requires the user to roll around on the ground, which can be unsanitary and uncomfortable.

The technologies disclosed herein are devices and methods for massaging, stimulating and scratching surfaces on human or animal bodies. In embodiments, this technology allows a user to easily alleviate the pain associated with muscle trigger points while simultaneously increasing circulation to the affected area for a lower cost than repeated visits to a masseuse and more facile implementation than a foam roller.

In one embodiment, the device includes an arrangement of generally domed-shaped protrusions, that have a thin central protruding rib. The shape of these protrusions is uniquely configured to be applicable to both scratching and massaging. In another embodiment there can be more than one protruding rib. The protrusions are arranged on a surface that is configured to be held in a person's hand—forming a hand-held unit. In another embodiment, the hand-held unit is securely, but removably, connected to a wall-type unit that is mounted on a vertical surface and may also include an arrangement of generally domed-shaped protrusions. In yet another embodiment, attachments are provided that may be stored in the wall-unit and securely, but removably, attach to one or more of the protrusions on either the hand-held unit or the wall-type unit.

Referring now to FIG. 1, a side view of an exemplary mounted apparatus 100 is illustrated, wherein the apparatus 100 is configured to pleasantly stimulate, scratch, and massage the body of the user. The apparatus 100 comprises a backing unit 102 that is configured such that it is easily mountable on a wall or other similar flat, vertical surface, a removably attached hand-held unit 104, a hinged door 106, and a plurality of protrusions 108 extending from the hand-held unit 104 and the hinged door 106. FIG. 1 illustrates only one row of protrusions 108 for ease of illustration; however, as illustrated in the figures below, in this embodiment there are multiple rows of protrusions 108. The base surfaces of the hand-held unit 104 and the hinged door 106 have a convex gradient to create a uniquely curved surface from which the plurality of convex protrusions 108 extend. Each of these features are described in greater detail below.

Figure 2A:
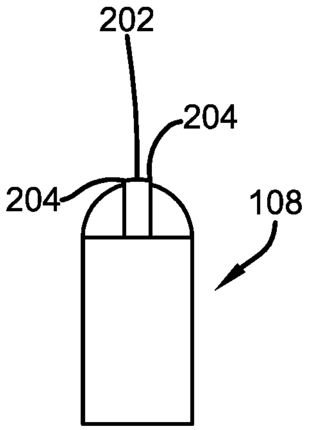
FIG. 2 includes a side view (FIG. 2A) and a top view (FIG. 2B) of an exemplary embodiment of an individual protrusion extending from the tissue therapy tool.
Figure 2B:
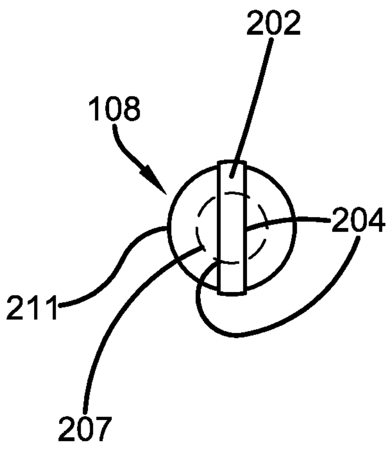

Referring now to FIG. 2, an exemplary diagram of an individual convex protrusion 108 that extends from the hand-held unit 104 and hinged door 106. The convex protrusion 108 can be a dome or a generally convex shape. Each protrusion 108 has a rib 202 extending vertically from a center portion of the convex surface of the protrusion 108 across the diameter of the convex protrusion 108. The rib 202 is a symmetrical protruding ridge, and in this embodiment, is a raised section of a dome, but without contour on the sharp, e.g. 90 degrees, edges 204 thereof. The rib 202 is similar in size and shape to a finger nail such that the tactile sensation when a user makes contact with the rib 202 is similar to that of scratching a body surface with a finger nail. In an embodiment, the rib 202 runs through a central area 207 that consists of the center 50% of a top surface of the convex protrusion 108. By "runs through a central area" it is meant that at least a part of the rib 202 runs through this area. This language is not meant to require all of a length or width of a rib 202 to be contained in this central area. The rib 202 extends vertically from the convex protrusion 108 to a height of 1 to 100 millimeters, such as, for example, 1.5 to 7.5 mm, or 2 to 5 mm. The rib 202 extends horizontally from the convex protrusion 108 to a width of 0.5 to 5 millimeters. In an embodiment, the central area 207 consists of the center 40% of a top surface, or the center 15% of the top surface. The central area 207 of the convex protrusion 108 is determined based on a top-down view of the protrusion 108 (e.g., FIG. 2B, and measuring a total area of the upward-facing surface of the protrusion 108. The 50% central area 207 is the total area of the upward-facing surface times 50%, that is centered on the center 209 of the convex protrusion 108 and having the same shape as the outer edge 211 of the convex protrusion 108 as shown in the top-down view of FIG. 2B. In FIG. 2B the shape of the central area 207 is circular because the outer edge 211 is circular.

Figure 3:
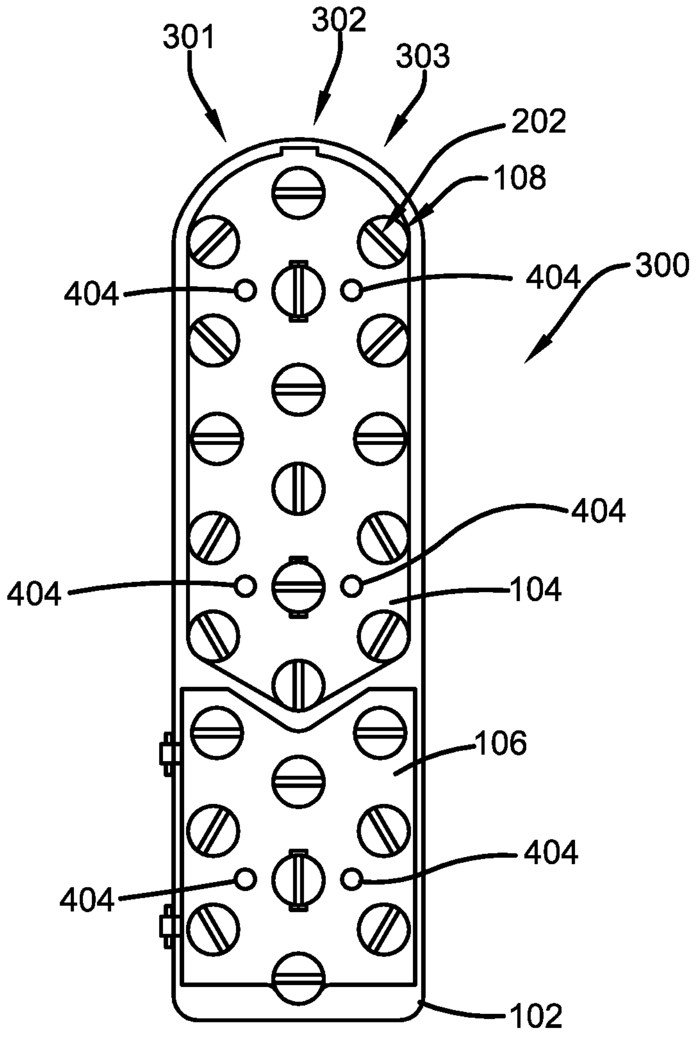
FIG. 3 is an overhead view of an exemplary orientation of the individual protrusions extending from the tissue therapy tool.

FIG. 3 shows an exemplary embodiment of a mounted apparatus 300 of the angles and arrangement of the convex protrusions 108 and the ribs 202 thereon. In this embodiment there are three columns, 301, 302, 303 of convex protrusions 108 with each of the two outer columns 301, 303 containing eight convex protrusions 108 and the middle column 302 containing nine convex protrusions 108.

In the embodiment 300, the rib 202 on each convex protrusion 108 is oriented at a different angle although each rib 202 is the same height and width, such that the user is able to achieve a more dynamic massaging experience where the mounted apparatus 300 simultaneously delivers up and down, side-to-side, diagonal, and/or other combination pressure from the rib 202 more akin to what a body surface experiences when scratched by actual fingernails, when fingers on a hand are bent and aligned for scratching. The ribs 202 on the eight convex protrusions 108 in the outer column 301 alternate from top to bottom as follows: diagonal right rib, diagonal left rib, horizontal rib, diagonal right rib, diagonal left rib, horizontal rib, diagonal right rib, and diagonal left rib. Diagonal right means slanted up on the right side, and diagonal left means slated up on the left side. The ribs 202 on the nine convex protrusions 108 in the center column 302 alternate from top to bottom as follows: horizontal rib, vertical rib, horizontal rib, vertical rib, horizontal rib, vertical rib, horizontal rib, vertical rib, and horizontal rib. The ribs 202 on the eight convex protrusions 108 on the outer column 303 alternate from top to bottom as follows: diagonal left rib, diagonal right rib, horizontal rib, diagonal left rib, diagonal right rib, horizontal rib, diagonal left rib, and diagonal right rib. In an embodiment, as shown in FIG. 3, going from top to bottom in any column 301-303, no rib 202 is oriented the same direction as its neighbor above or below it. In an embodiment, as shown in FIG. 3, the two outer columns 301, 303, are mirror images of each other.

Figure 4:
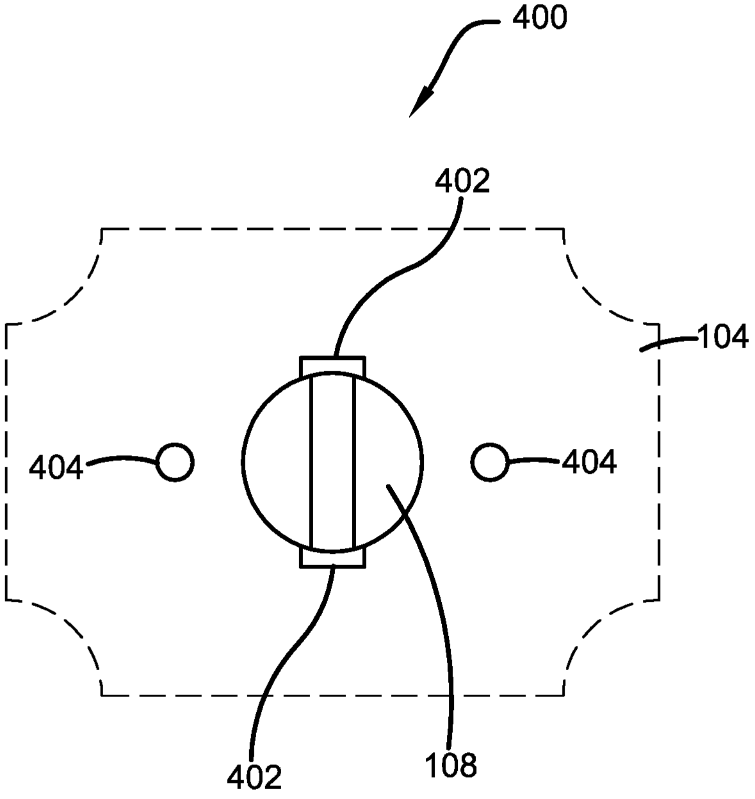
FIG. 4 is a zoomed-in overhead view of an exemplary protrusion with the ridges allowing an attachment to be removably fitted to the protrusion.

FIG. 4 is top-down magnified view 400 of one convex protrusion 108 from a second column 302 of the apparatus 300 of FIG. 3 disposed on a surface of the handheld unit 104. The convex protrusion 108 is configured such that the user is able to place a specialized attachment (see FIG. 5, 502) on one or more convex protrusions 108, secured with a twist-lock mechanism. This allows a user to utilize other unique shapes with specialized purposes for body stimulation. The convex protrusion 108 is outfitted with two nibs 402 extending from opposite vertical sides of the convex protrusion 108. In addition, in an embodiment, there are two concave dimples 404 imprinted into the base of the hand-held unit 104 on either side of the convex protrusion 108. Alternatively, if the convex protrusion 108 illustrated in the magnified view 400 was located on the hinged door 106, the concave dimples 404 would be imprinted into the base of the hinged door 106.

Figure 5A:
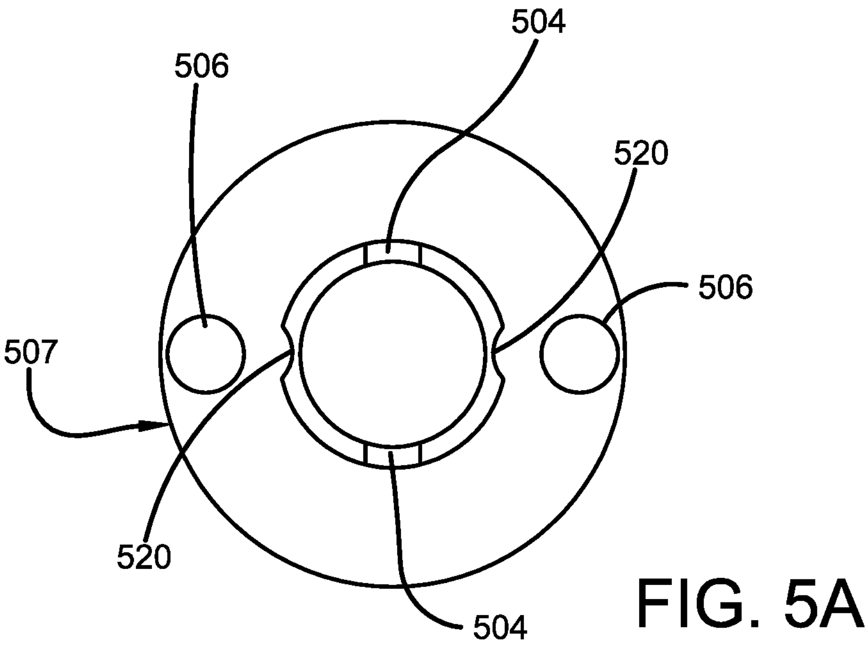
FIG. 5 includes a cross-sectional top view (FIG. 5A) and a side view (FIG. 5B) of an exemplary attachment for fitting on the protrusion.
Figure 5B:
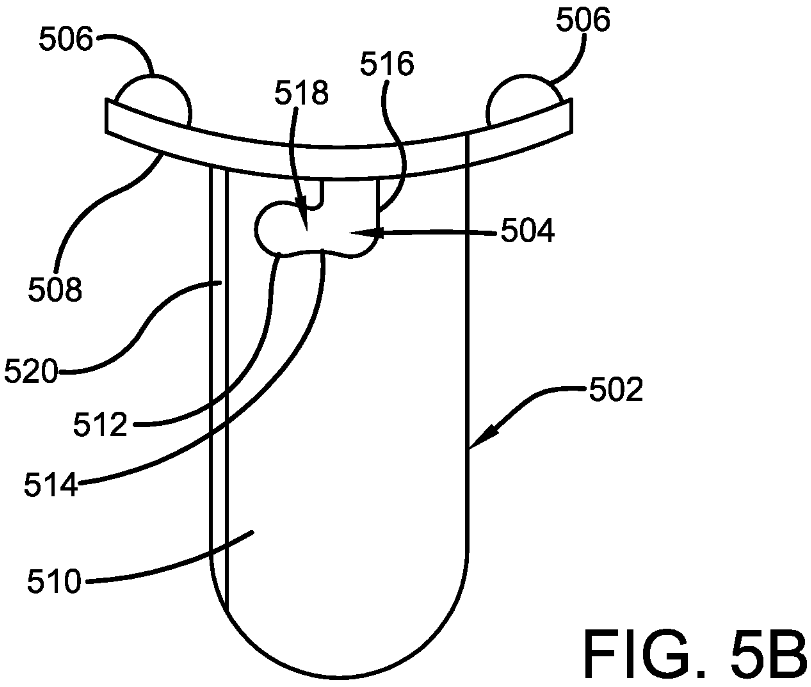
Figure 6A:
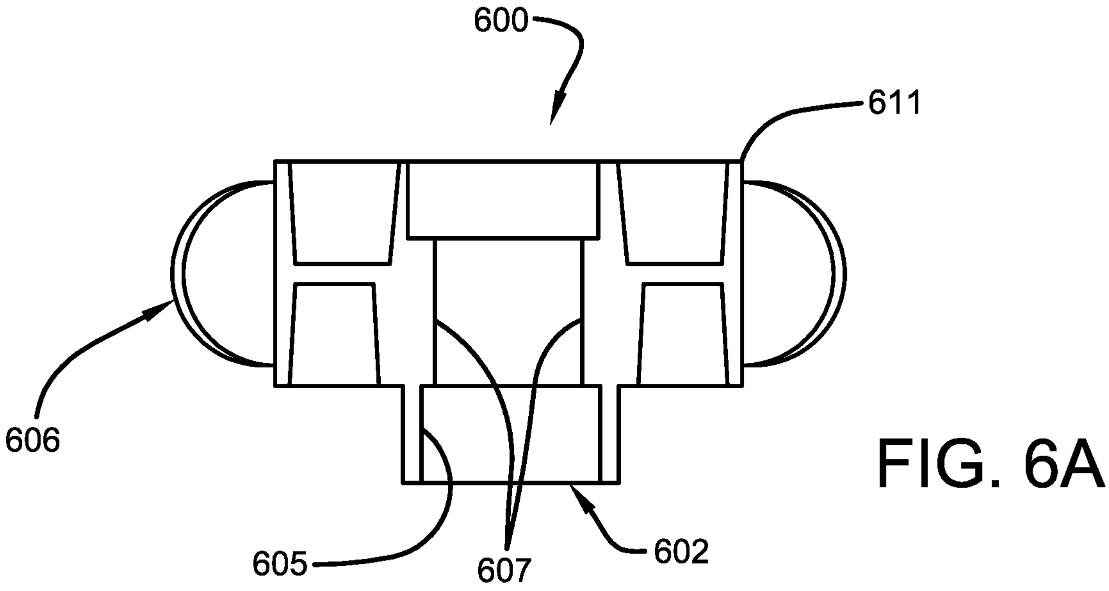
FIG. 6 includes a cross-sectional side view (FIG. 6A) and a cross-sectional top view (FIG. 6B) of an exemplary roller attachment for an additional attachment shown in a top view (FIG. 6C) and a side view (FIG. 6D) that fits onto the attachment shown in FIG. 5.
Figure 6B:
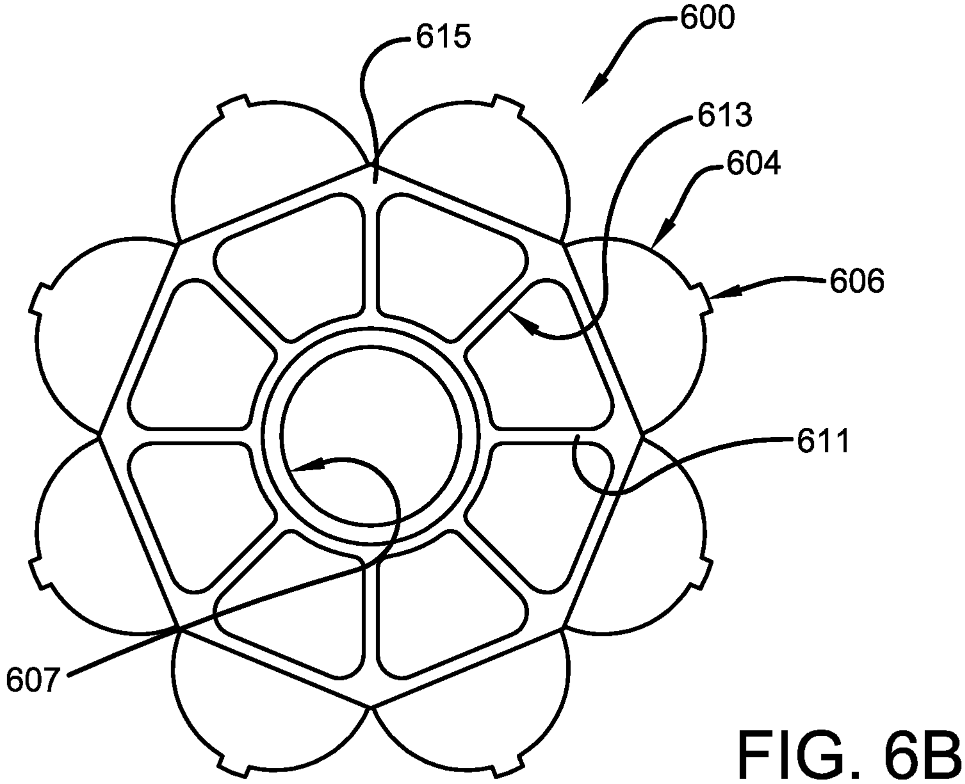
Figure 6C:
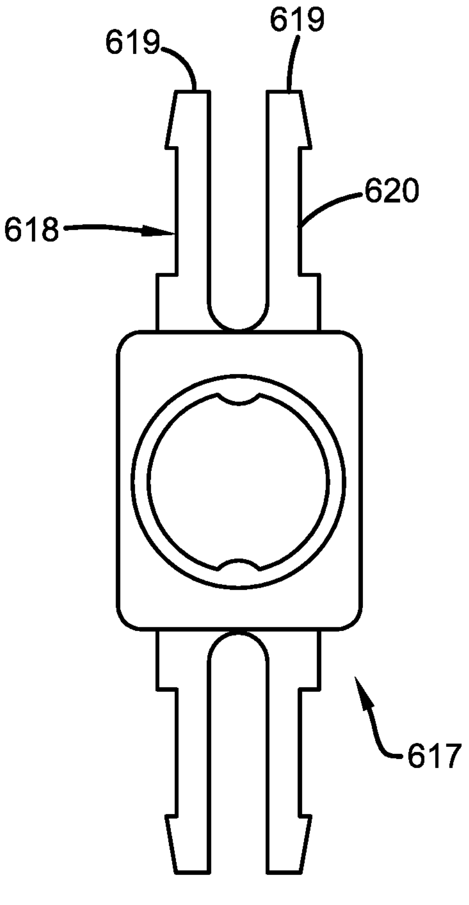
Figure 6D:
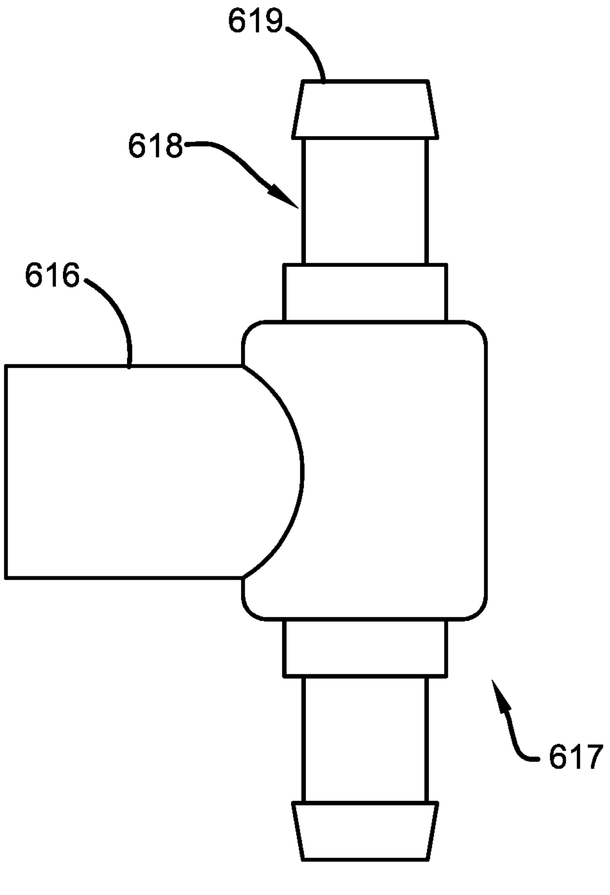

Turning now to FIG. 5, a specialized attachment 502 is configured to removably fasten onto a protrusion 108. In an embodiment, this protrusion 108 is located in the middle column 302, such as the second, fifth, or eighth protrusion 108 down from the top of the device 300 (See FIG. 3). The attachment 502 has two side openings 504 on either side of a convex protrusion 510 and two convex nibs 506 extending from the base 508 of the attachment 502. The base 508 of the attachment 502 is a convex shape identical to that of the base surfaces of the hand-held unit 104 and the hinged door 106, as discussed above in regard to FIG. 1. The convex protrusion 510 is slightly larger in radius than the protrusion 108, and is configured to fit over top of the protrusion 108. The side openings 504 are roughly L-shaped, and consist of a vertical portion starting at the base 508 of the attachment and extending upward to a height approximately equal to the height of the tallest portion of the nibs 402 on the convex protrusion 108. The side openings 504 then turn sharply to the side and extend horizontally at an approximately 90-degree angle, which can range from plus or minus 5 degrees, 3 degrees, or 1 degree from a 90-degree angle, from the vertical portion of the opening 504. The side-openings 504 terminate in a circular extension 512. The circular extension 512 is configured to receive the nibs 402 of the convex protrusion 108. A neck 514 of the circular extension 512 defines an opening that closely matches the radius or outer circumference of the nibs 402 of the protrusion.

The configuration of the side openings 504, allows the side-openings 504 to receive the nibs 402 into its vertical portion as the attachment 502 is slid down onto the convex protrusion 108. Then when the nibs 402 reach the top of the vertical portion 516 of the side-openings 504, the attachment 502 is rotated clockwise (when viewed from the top), so that the nibs 402 then slide into the horizontal portion 518 of the side-openings 504. The attachment 502 is thus locked into place in part due to the close tolerance of the nibs 402 (e.g., 0 to 1% or 0.0001 to 0.1% from being the same vertical height) and the neck 514 of the circular extension 512. When the attachment 502 is thus positioned, the locking engagement is also facilitated by the dimples 404 on the base 102 receiving the convex nibs 506, which stabilize the attachment 502, prevent rocking or other jostling during use, and also provide a force on the attachment 502 to keep the nibs 402 that have rotated into the circular extension 512 from rotating back past the neck 514 of the side openings 504. The attachment 502 is made of a rigid but somewhat flexible material such as plastic, so that the base 508 can slightly flex to allow the convex nibs 506 to rotate into alignment with the dimples 404. When pressed against a user's skin, the nibs 402 are pressed down towards the bottom side of the circular extension 512 so as not to be aligned with the opening of the neck 514. In this manner, the attachment 502 stays in locked engagement with the convex protrusion 108.

The attachment 502 can also be removed by the user by rotating the attachment 502 (e.g. counter-clockwise) such that the nibs 402 move through the neck 514 of the circular extension 512 back along the horizontal portion 518 of the side openings 504 until they reach the vertical portion 516 of the side openings 504 and can then be slipped off the convex protrusion 108 by sliding the attachment 502 away from the convex protrusion 108 until the nibs 402 reach the base of the attachment 502 and exit the vertical portion 516 of the opening 504.

In an embodiment the convex protrusion 510 also includes concave channels 520 that run length-wise on opposite sides of the convex protrusion 510. This is for fitting with the additional fixture 600 described below.

Referring now to FIGS. 6A, 6B, 6C, and 6D an additional fixture 600 that can be fastened on to the attachment 502 for even more varied body stimulation is shown in a side cross-section (6A), top cross-section (6B), and top side view of the fixture 600 attachment mechanism (6C) and a side view of the fixture 600 attachment mechanism (6D). The fixture 600 is fastened to the attachment 502 via the attachment mechanism 617 illustrated in FIG. 6C. The receiving end 616 is slid over the convex surface of the attachment 502 to a stop point. In an embodiment, the receiving end 602 defines an opening 605 configured to fit tightly over an attachment arm 618. The attachment arm 618 is comprised of two prongs 619 that when the opening 605 is slid over the prongs 619, the prongs 619 slightly compress toward each other until the opening 605 of the attachment 600 reach an indent 620 at which point the pressure on the prongs releases and the attachment 600 is secured onto the attachment arm 618. To remove the attachment 600 from the attachment arm, a user compresses the prongs 619 toward each other until the opening 605 of the attachment 600 can be slid out of the indent 620 and fully removed from the attachment arm 618. In an embodiment, the opening 605 has a shape that is generally tubular but interrupted by a protruding ridge 607 running around the inner radius of the opening 605. The ridge 607 is configured to closely fit into the indent 620 of the attachment arm 618.

The fixture 600 comprises a wheel 611 that is rotatably fastened to the receiving end 602 of the fixture 600. The wheel 611 has several spokes 613 and an outer edge 615 on which a plurality of protuberances 604 are disposed. These protuberances 604 are similar in shape to the convex protrusions 108 shown in FIGS. 1, 2, et al. Each protuberance 604 has a rib 606, similar in shape to the rib 202 that extends from the convex protrusions 108. These ribs 606 extend from the central portion of the protuberance along the midline of the protuberance 604. In embodiments, the ribs 606, may occupy the same central area as the ribs 202 described above and have the same dimensions as the ribs 202 described above.

Figure 7:
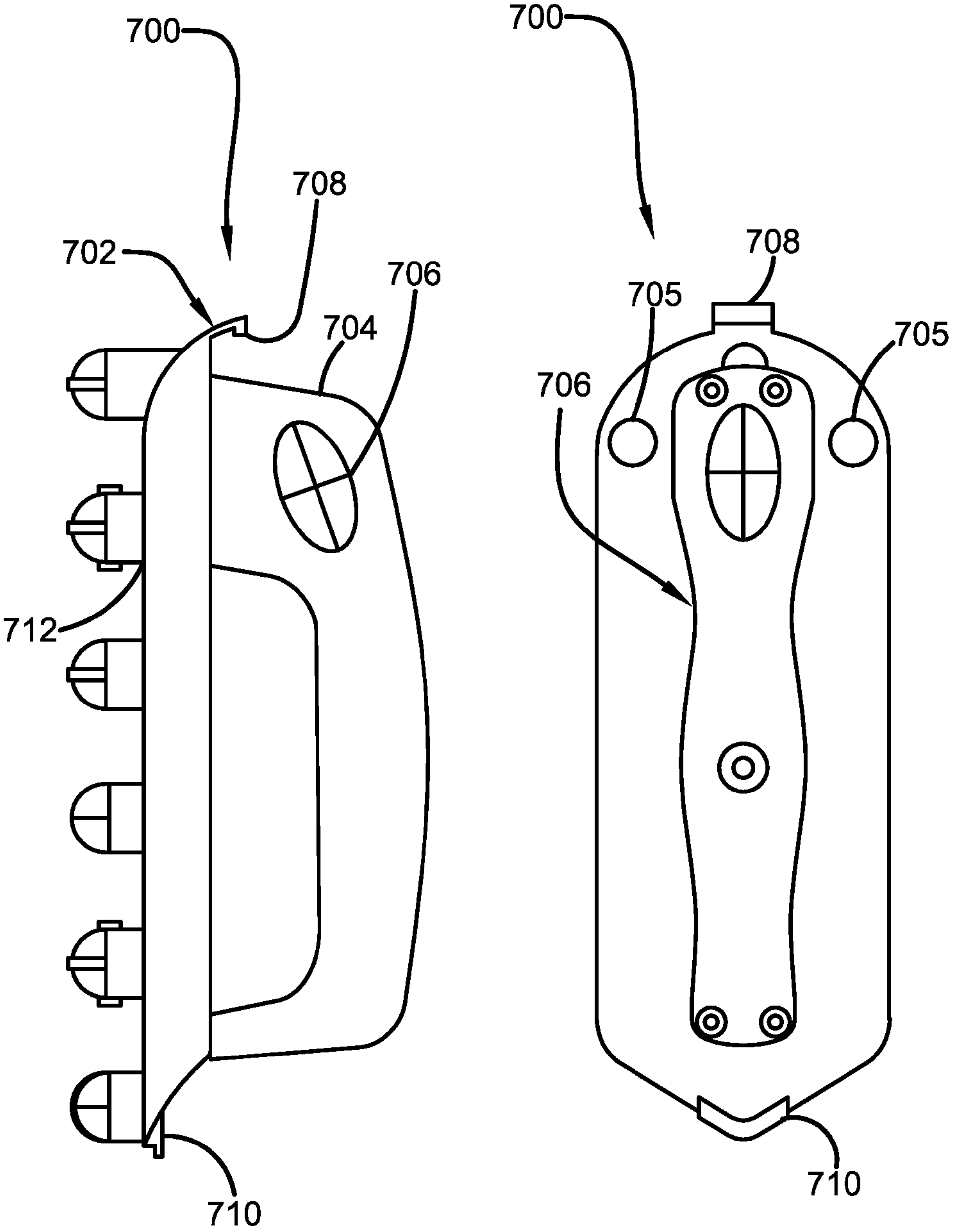
FIG. 7 includes a cross-sectional side view (FIG. 7A) and a cross-sectional back view (FIG. 7B) of an exemplary embodiment of the removable handheld unit.

FIG. 7 shows several views of an exemplary apparatus 700 of the handheld unit 104 first discussed above with FIG. 1, which, in this diagram, has been removed from the backing unit 102. The handheld unit 104 is ordinarily attached to the backing unit 102 by a top anchoring tab 708 and a bottom anchoring tab 710. The bottom anchoring tab 710 fits into a v-shaped slotted recess in the base of the backing unit 102 where the handheld unit 104 rests. The top anchoring tab 708 latches over a ridge at the top of the backing unit 102 where the handheld unit 104 rests. To remove the handheld unit 104 from the backing unit 102, a user would pull on the top anchoring tab 708 to disengage the top anchoring tab 708 from the ridge at the top of the backing unit 102 and tilt the handheld unit 104 back toward the user, thus separating the top half of the handheld unit 104 from the backing unit 102. The user then lifts upward on the handheld unit 104 until the bottom anchoring tab 710 is pulled entirely out of the slot in the base of the backing unit 102 where the handheld unit 104 rests. The handheld unit 104 is then fully detached from the backing unit 102 and ready for handheld use.

The handheld unit 104 comprises a base 702 that has a curved top surface from which the convex protrusions 108 all extend in identical direction regardless of where the anchoring point 712 for each convex protrusion 108 is on the base 702. In an embodiment, the convex protrusions 108 extend to a uniform height. In an additional embodiment, the convex protrusions 108 in the outer columns 301, 303 extend to a uniform height while the convex protrusions 108 in the center column 302 extend slightly higher than the convex protrusions 108 in the outer columns 301, 303. For example, the convex protrusions 108 in the outer columns 301, 303 extend to a height that is 0.1 to 3 centimeters, such as 0.5 to 2.5, or 1 to 2 centimeters greater than the convex protrusions 108 in the center column 302.

In addition, the handheld unit 104 contains a handle 704, which the user may grasp for application of the handheld unit 104 to areas of the body other than those easily accessible when mounted to the backing unit 102. In an embodiment, the handle 704 has indents 706 on the sides of the handle 704 to provide an ergonomic feel and allow the user's thumb a more convenient place to rest during use for increased comfort. In an embodiment, the handheld unit 104 contains post-holes 705 that receive posts extending from the backing unit 102 as further described below.

In an embodiment, the handle 704 of the handheld unit 104 has a hollow interior in which a vibrating motor is disposed that when activated causes the handheld unit 704 to vibrate pleasantly thereby elevating the relaxing effects experienced by the user. The vibrating motor can be powered by internal batteries or optionally can be charged externally with an external power port/cord housed in the backing unit 102. Alternatively, a power cord can be at least partially housed in the backing unit 102 and may be at least partially retractable into the backing unit 102.

FIG. 7 exhibits a top anchoring tab 708 and a bottom anchoring tab 710 that fit into corresponding recesses in the backing unit 102. The top recess includes a lip that the top anchoring tab 708 must slightly bend outward in order to fit over and be secured. The top anchoring tab 708 is made of a sturdy rigid material that may slightly bend without breaking and withstand a side-to-side back scratching motion of user. The bottom anchoring tab 710 fits into a v-shaped slotted recess in the backing unit 102, shown in FIGS. 11A and 11B below, further securing and supporting the handheld unit 104 in the backing unit 102 against side-to-side pressure.

The powering of the vibrating motor is achieved by batteries or electrical current flowing from a external outlet through an electric plug (USB or otherwise) attached to the backing unit 102, which then flows through the backing unit 102 to the charging nodes on the posts to the handheld unit 104 and ultimately the vibrating motor.

Figure 8A:
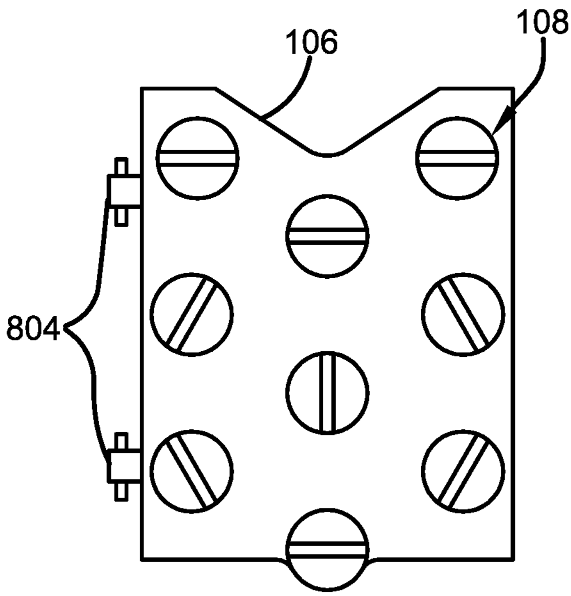
FIG. 8 includes a top view (FIG. 8A), a cross-sectional side view (FIG. 8B), and a cross-sectional bottom side view (FIG. 8C) of an exemplary embodiment of the door on the tissue therapy tool.
Figure 8B:
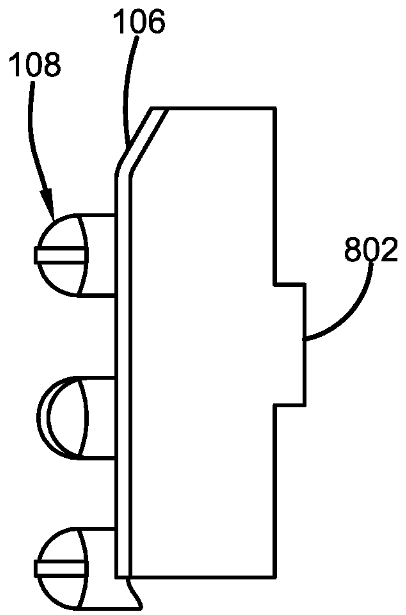
Figure 8C:
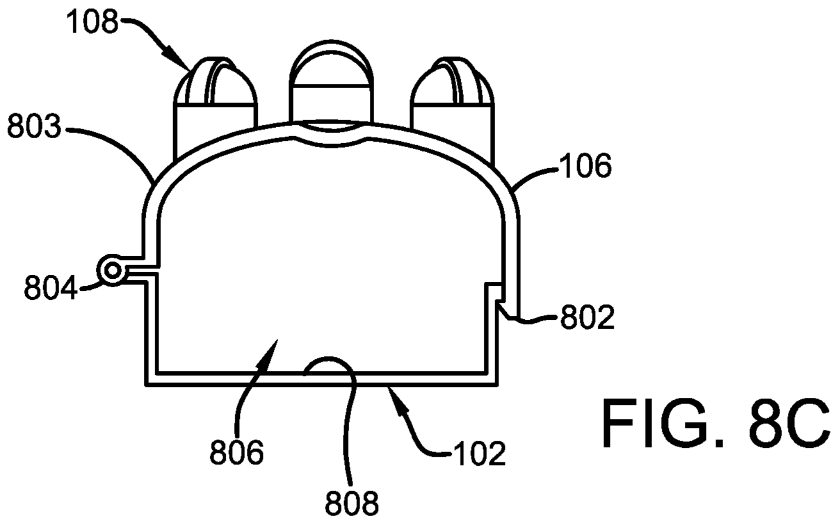

Referring now to FIG. 8, which shows a top view FIG. 8A, a side view FIG. 8B, which shows only one row of protrusions 108 for ease of illustration, and a cross-sectional bottom side view FIG. 8C of a magnified view of the hinged door 106. The hinged door 106 is permanently affixed to the backing unit 102 of the mounted apparatus 100 through the hinged coupling 804, as shown in FIG. 8C. The hinged door 106 comprises a base 803 that has a curved top surface from which the convex protrusions 108 all extend in identical direction regardless of where the anchoring point for each convex protrusion 108 is on the base 803. The latch 802 has a beveled edge to enable easier opening and closing. The hinged door 106 has a latch 802 that allows the user to easily open the door 106 when the latch 802 is pulled outward toward a user and allows the hinged door 106 to rotate on the hinged coupling 804 to expose a hollow storage area 806 between the door and the vertical surface 808 of the hollow storage area 806. The storage area 806 can be used to store the attachment 502, the additional fixture 600, or whatever small trinkets the user desires to store therein.

Figure 9A:
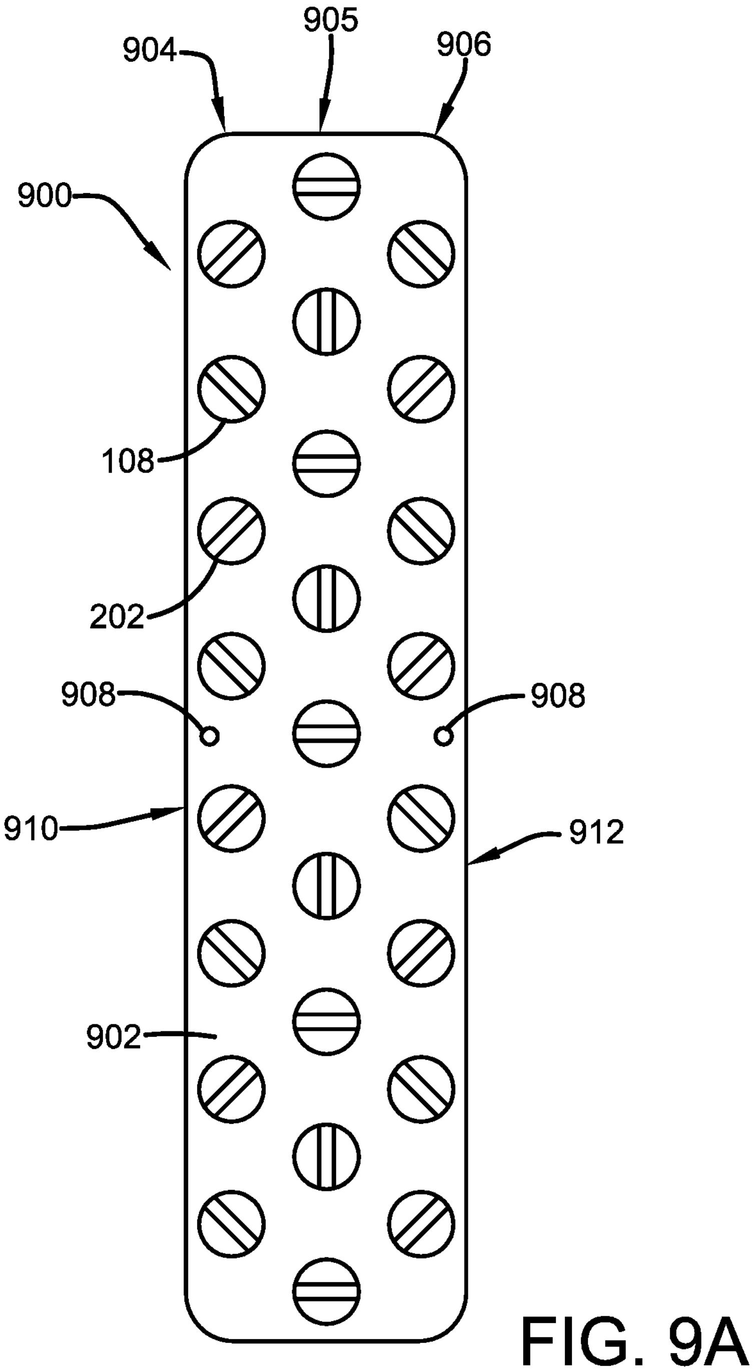
FIG. 9 includes a top view (FIG. 9A) and a cross-sectional side view (FIG. 9B) of an exemplary tissue therapy tool for mounting on the corner of a vertical surface.
Figure 9B:
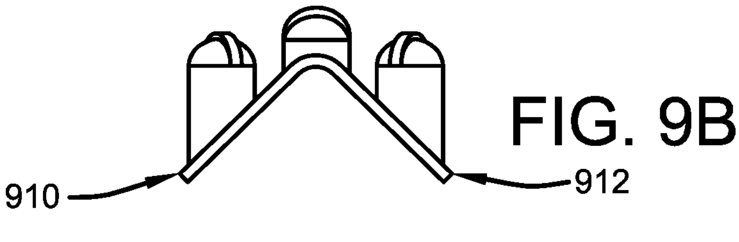

FIG. 9 shows an additional corner apparatus 900 that is configured so that it can be fitted to and mounted to the corner of a wall or other similar angled, vertical surface. The corner base 902, consists of two sides that meet to form a 90-degree angle. The corner base 902 has a V-shaped top surface. V-shaped, may include a V with an ergonomically rounded point. From the corner base 902 extend protrusions 108 that extend in the same direction regardless of where on the flange the protrusion 108 is situated. In an embodiment, the convex protrusions 108 point in the same direction as the point of the V-shape.

In an embodiment, there are three rows 904, 905, and 906 of convex protrusions 108: two outer rows 904 and 906, where row 904 is on side 910 and row 906 is on side 912, and one central row 905 of convex protrusions 108 along the 90-degree angle where the two sides 910 and 912 meet. The convex protrusions 108 which extend from the corner base 902 also have the same ribs 202 as discussed more thoroughly above, which allow for a more dynamic stimulation experience. Similarly, to the embodiment 300 shown in FIG. 3, the rib 202 on each convex protrusion 108 is oriented at a different angle, although each rib 202 is the same height and width, such that the user is able to achieve a more dynamic massaging experience where the corner apparatus 900 simultaneously delivers up/down, side/side, diagonal, and/or other combination pressure from the rib 202 when a user rubs against it. The convex protrusions 108 and ribs 202 may have the same range of dimensions, orientations, and heights as disclosed above.

Figure 10A:
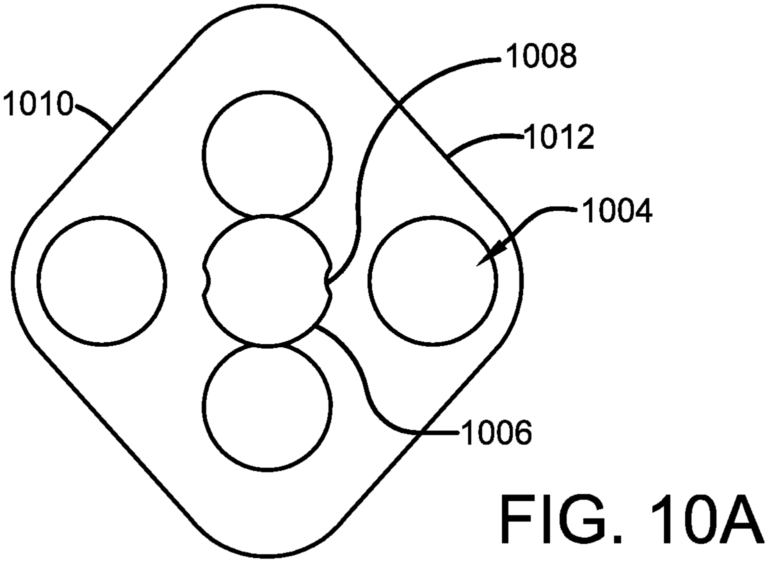
FIG. 10 includes a top view (FIG. 10A) and a side view (FIG. 10B) of an exemplary attachment for fitting over a protrusion on the corner-mounted tissue therapy tool.
Figure 10B:
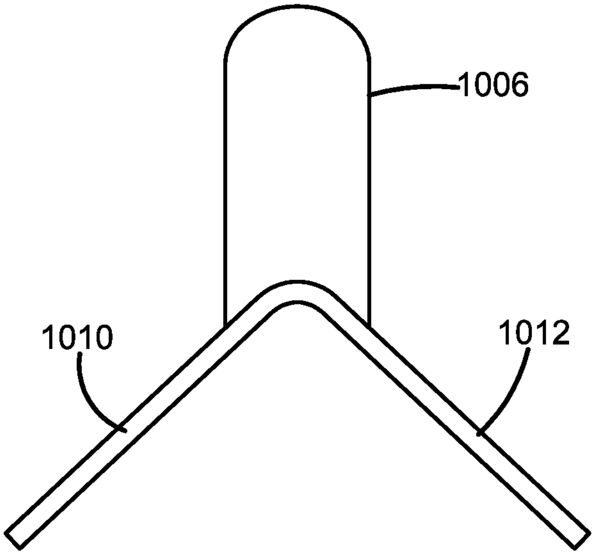

The corner base 902 can be mounted onto the corner of a wall or other such vertical 90-degree surface by securing the corner base 902 using an adhesion apparatus or mechanically fastened through the screw or nail holes 908 on each side 910, 912 of the corner base 902. Other embodiments may have various numbers of screw or nail holes in other locations on the device. In addition, the corner unit 900 can be combined with features of the wall unit 100 described above. For example, the corner unit 900 can be configured to comprise of a v-shaped handheld unit that can be removed from the corner base 902 for ease of use. The corner unit 900 can be further configured to comprise of a v-shaped hinged door behind which is storage space for attachments or other such small items FIG. 10 includes a top 10A and side view 10B of a corner attachment 1002 configured to removably fasten onto the convex protrusion 108. The corner attachment 1002 is generally diamond shaped, and similarly angled to match the corner base 902 such that it comprises two sides 1010, 1012 that meet to form a 90-degree angle to couple with sides 910 and 912, respectively, of the corner base 902. The corner attachment 1002 has a multitude of holes 1004 which, when slid down over the protrusions 108, removably, but securely, affixes the corner attachment 1002 to the corner base 902. A projection 1006 then extends from the corner attachment 1002, which can be used to target specific areas of the user's skin, or to which an additional fixture 600 can be attached. In an embodiment the convex projection 1006 also includes concave channels 1008 that run length-wise on opposite sides of the convex protrusion 510. This is for fitting with an additional fixture such as the additional fixture 600 as discussed above in FIG. 6.

Figure 11A:
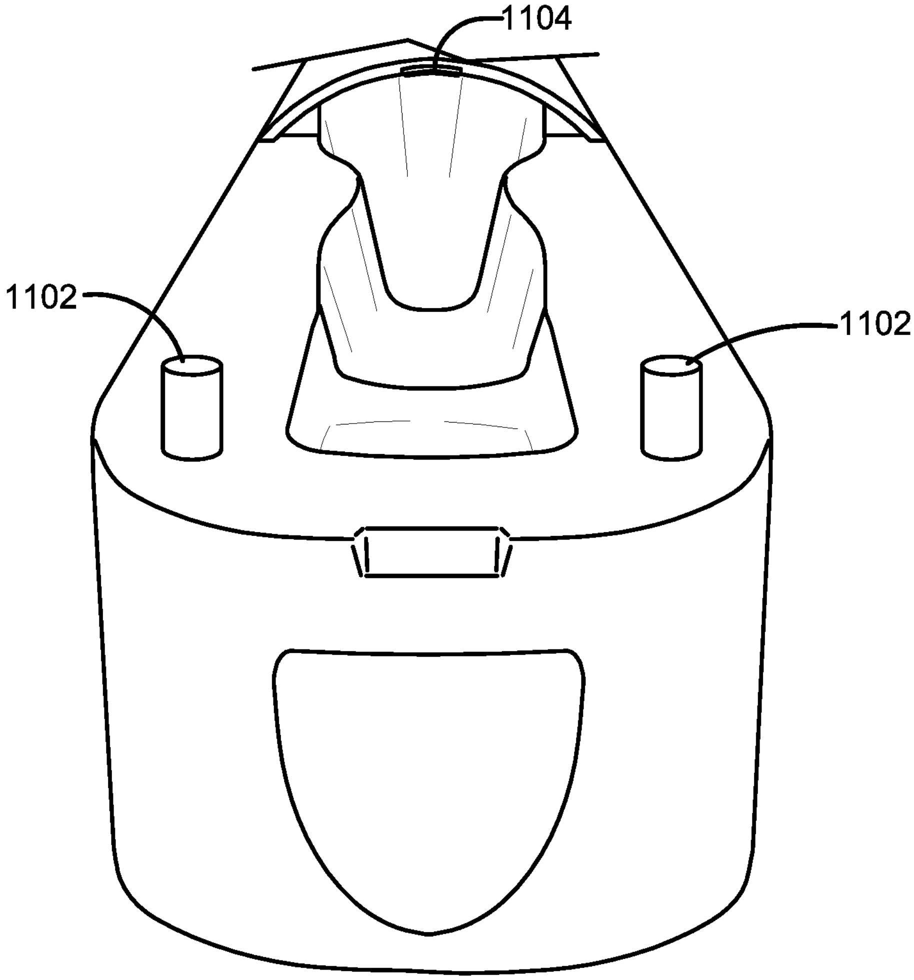
FIG. 11 includes a zoomed over head view (FIG. 11A) and a top view (FIG. 11B) of an exemplary wall unit in which to mount the handheld unit.
Figure 11B:
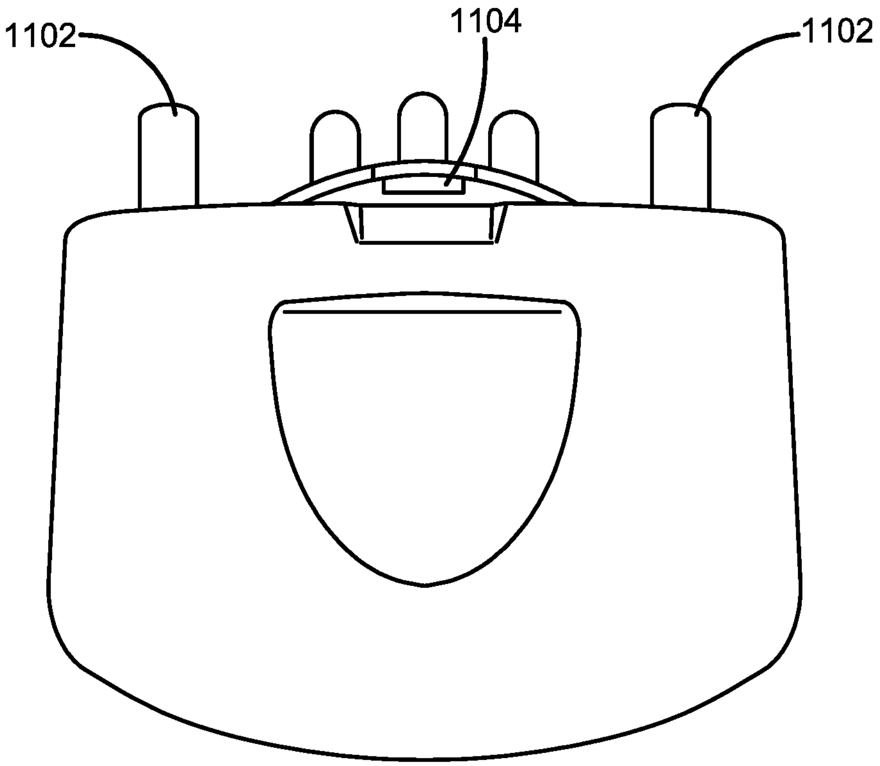

FIG. 11 includes an overhead perspective 11A and a top down view 11B of the mounting portion of the backing unit for the handheld unit 104. As shown in FIG. 11A, the top of the frame for the hinged door 106 has a v-shaped slotted recess 1104 to receive the bottom anchoring tab 710 (see FIG. 7) of the hand-held unit 104 to aid in securing the handheld unit 104 to the backing unit 102. To further secure the handheld unit 104 to the backing unit 102, post-holes 705 (See FIG. 7) extending inward into the back of the handheld unit receive posts 1102 extending from the backing unit 102 to secure the handheld unit 104 to the backing unit 102 when being used as a mounted apparatus 100. In an embodiment, the posts 1102 that secure the handheld unit 104 to the backing unit 102 can serve the dual purpose of securing the handheld unit 104 by preventing excessive side-to-side movement and being contacts for charging the vibrating motor within the handheld unit 104 with charging nodes at the end of each post. In this embodiment, the posts 1102 have a substantial length (e.g., 2 to 10 cm, such as 3 to 8, or 4 to 7 cm) and a diameter (e.g., 1 to 5 cm, such as 1.5 to 4, or 2 to 3.5 cm) that extends into the post-holes, so as to securely anchor the handheld unit 104 to the backing unit 102, such that the device is configured for receiving heavy side-to-side pressure from a back scratching motion of a user. In an embodiment, clearance between the post-holes 705 and posts 1102 may be small, such e.g., 0.0001 cm to 0.1 cm, 0.001 to 0.005 cm, or 0.01 cm to 0.09 cm.

In an embodiment, the backing unit 102 is mounted onto a vertical surface at a height within the average height of a human torso. The backing unit 102 is removably mounted to a wall or other similar vertical surface at a height such that the bottom of the backing unit 102 (i.e., a bottom height of the backing unit 102) is at the height of the top of the average user's waist and/or the top of the backing unit 102 is at the height of an average user's shoulder. This length is defined herein as torso length. The backing unit 102 ranges in height from 5 to 30 inches long to reasonably accommodate all torso lengths, such as 12 to 25 inches, or 15 to 20 inches long to encapsulate a broad array of torso sizes, both male and female. The bottom mounting height on the wall may be 35 to 46 from the surface directly beneath the backing unit 102, (e.g., the floor), such as 38 to 44, or 40 to 42 inches. The top mounting height on the wall may be 48 to 62 from the surface directly beneath the backing unit 102, (e.g., the floor), such as 50 to 60, or 52 to 56 inches. In an embodiment, the backing unit 102 can be attached to the wall or wall-type surface with a screw or a nail or even with an adhesive or adhesive-assisted product.

The handheld unit 104 is docked in the receiving portion of the backing unit 102 and the hinged door 106 is closed, such that a user can back up to the entire mounted unit 100 and rub his or her back up against the convex protrusions 108 extending from the hinged door 106 and the handheld unit 104 at a pressure that is comfortable to the user. The user can then enjoy the combination scratching and massaging sensations provided by the ribs 202 and convex protrusions 108.

In another embodiment, the main mounted unit is the corner apparatus 900, which is mounted onto a corner of a wall to allow for more angular mobility when the user rubs his or her back against the convex protrusions 108 and the ribs 202 thereon.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner such as the term "comprising." The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. If not apparent from the context, any measurement is to be conducted at 70° F. and 1 atm.

It is claimed:

1. An apparatus comprising:

a plurality of convex protrusions on each of which a raised rib runs through a central area thereof, the central area consisting of the center 50% of a top surface of the convex protrusion, wherein each of the plurality of convex protrusions is coupled to a backing;

wherein the apparatus is configured for deep tissue massage and scratching via the plurality of convex protrusions and the raised ribs;

wherein the protrusions are generally cylindrical with a generally dome-shaped top portion.

2. The apparatus of claim 1, wherein two or more of the ribs on the plurality of convex protrusions are oriented in different directions.

3. The apparatus of claim 1, wherein the backing further comprises a handle containing a vibrating motor on a side of the backing opposite of the protrusions.

4. The apparatus of claim 1, wherein a nib extends from a side of at least one of the convex protrusions, and the nib is configured for coupling and securing an attachment to the convex protrusion.

5. The apparatus of claim 1, wherein a back surface of the backing is flat and is configured for mounting flush with a flat vertical surface.

6. The apparatus of claim 1, wherein the backing is angularly configured for mounting on a single corner of a vertical surface.

7. An apparatus for mounting on a vertical surface comprising:

a plurality of convex protrusions extending from a handled backing that is removably attached to a backing unit at a docking port, wherein a nib extends from a side of at least one convex protrusion and fits into a channel of an attachment to the convex protrusion, the channel at least partially circumscribing the attachment;

wherein a raised rib runs through a central area of at least one convex protrusion, the central area consisting of the center 50% of a top surface of the at least one convex protrusion;

wherein the apparatus is configured for deep tissue massage and scratching via the plurality of convex protrusions and the raised rib;

with a generally dome-shaped top portion and tapered.

8. The apparatus of claim 7, wherein the handled backing contains a vibrating motor.

9. The apparatus of claim 7, wherein the convex protrusions are configured such that there are 3 to 5 of the protrusions per row and 10 to 30 of the protrusions per column.

10. The apparatus of claim 7, wherein the vertical surface unit contains a storage compartment enclosed by a hinged door.

11. The apparatus of claim 7, wherein the handled backing contains a vibrating motor and a charging port receiver electrically coupled to a power source that powers the vibrating motor; the charging port receiver configured to receive a post-shaped charging port, the post-shaped charging port being permanently affixed to the vertical surface unit at the docking port.

12. The apparatus of claim 7, wherein the attachment comprises a wheel.

13. The apparatus of claim 7, wherein the vertical height of the surface-unit is ten to thirty inches long.

14. A method for scratching or massaging human or animal body surfaces, comprising:

mounting to a wall a device comprising a plurality of convex protrusions from which a rib runs through a central area of at least one convex protrusion, the central area consisting of the center 50% of the convex surface of the protrusion wherein the protrusion is coupled to a backing unit, wherein the backing unit has a bottom mounting height of 35 to 46 inches and a top mounting height of 48 to 62 inches; and moving the body surface against the at least one convex protrusion;

performing deep tissue massage and scratching via the plurality of convex protrusions and rib;

wherein the protrusions are generally cylindrical with a generally dome-shaped top portion.

15. The method of claim 14, further comprising removing a hand-held unit from the backing unit and moving the hand-held unit against the body surface.

16. The method of claim 14, further comprising attaching an attachment to the convex protrusion, the attaching including placing the attachment over the convex protrusion and fitting a nib on the convex protrusion into a channel that at least partially circumscribes the attachment, and rotating the nib in relation to the convex protrusion, thereby securing the attachment.

17. The method of claim 16, further comprising attaching a wheel.

18. The apparatus of claim 1, wherein a single raised rib runs through each convex protrusion.

19. The apparatus of claim 1, wherein the raised rib is one to five millimeters tall.

20. The apparatus of claim 1 wherein the raised rib is a section of a dome.

21. The apparatus of claim 7, wherein the convex protrusions extend to a height that is 0.1 to 3 centimeters from the backing.

* * * * *